United States Patent [19]

Yuda et al.

[11] 4,064,420
[45] Dec. 20, 1977

[54] CONTROL SYSTEM FOR POLE-CHANGING-MOTOR-DRIVEN COMPRESSOR

[75] Inventors: Jiro Yuda, Nara; Hiroshi Morokoshi; Michimasa Hori, both of Yamatokooriyama; Mitsuhiro Ikoma, Tenri; Takeshi Aizawa, Ikoma, all of Japan

[73] Assignee: Matsushita Electric Industrial Co., Ltd., Japan

[21] Appl. No.: 675,827

[22] Filed: Apr. 12, 1976

[30] Foreign Application Priority Data

Apr. 18, 1975 Japan .................. 50-47719
May 19, 1975 Japan .................. 50-60416
Sept. 16, 1975 Japan .................. 50-112437
Sept. 30, 1975 Japan .................. 50-118372

[51] Int. Cl.² .................. H02P 1/44
[52] U.S. Cl. .................. 318/224 A; 318/221 R; 318/481
[58] Field of Search .......... 318/224 A, 224 R, 221 R, 318/221 G, 481, 221 A

[56] References Cited

U.S. PATENT DOCUMENTS

| | | | |
|---|---|---|---|
| 3,102,677 | 9/1963 | Evans et al. | 318/481 X |
| 3,305,715 | 2/1967 | Stenger | 318/221 R |
| 3,978,382 | 8/1976 | Pfarrer et al. | 318/224 A |

Primary Examiner—Herman J. Hohauser
Attorney, Agent, or Firm—Burgess, Ryan and Wayne

[57] ABSTRACT

A control system for a compressor driven by a pole-changing motor comprises a pole changer for the motor, a contactor for stopping the motor for a predetermined time in case of the pole changing, and a switch responsive to the variation in a physical quantity which occurs in the compressor every time when the latter is stopped, whereby the motor is stopped in case of the pole changing and then is started again in response to the actuation of the switch. This control system is especially adapted for use in a pole-changing-motor-driven compressor used in a refrigeration cycle of an air conditioner.

18 Claims, 5 Drawing Figures

CONTROL SYSTEM FOR POLE-CHANGING-MOTOR-DRIVEN COMPRESSOR

BACKGROUND OF THE INVENTION

The present invention relates to a control system for a compressor driven by a pole-changing motor whose speed is changed to change the compression capacity of the compressor depending upon the variation on load, and more particularly a control system which stops the motor and hence the compressor in case of the pole changing before the motor is started again, thereby ensuring the reliable and dependable pole changing operation.

There have been devised and demonstrated compressors of the type whose fluid delivery capacity may be changed by the change in speed of a motor for driving the compressor in response to the variation in load. For instance, in pole-changing-motor-driven compressors, the windings of the motor are changed to either the high- or low-speed connection depending upon the load on the compressor so that the latter is driven at a high or low speed. However, during the switching between the high- and low-speed connections the power supply to the motor is interrupted for some time which is very short. In general the load torque of the compressor is high while the inertia is small so that when the motor is de-energized the torque produced by the motor immediately decreases lower than the load torque on the compressor and is stopped. Therefore in practice it has been very difficult to attain the continuous pole changing of the motor for driving the compressor. Especially when the winding of the pole-changing motor are changed to the low-speed connection (or full-pole connection) from the high-speed connection (or half-pole connection) and if the motor has been rotating at a speed higher than the synchronous speed at the low-speed connection, the reverse torque is produced, thus resulting in the sudden change in rotational speed of the motor so that the abnormally high stresses are produced in the driving shaft of the motor. To overcome this problem, the motor must be stopped once in case of the pole changing, and then re-started. However, because of the difference in pressure between the suction and discharge sides of the compressor (to be also referred to as "the pressure difference across the compressor" in this specification), the starting load is generally higher than the starting torque of the motor. Therefore the motor must be started again only after the pressure difference across the compressor decreases to a certain level so that the starting load becomes equal to or less than the starting torque available. In other words, the motor must be stopped in case of the pole changing and must be started again a predetermined time after it was stopped. For this purpose, there has been proposed to use time-delay relays or the like, but the conventional time-delay relays or the like must remain on even after the motor is started again in order to keep it driving. More suitable switches such as a pressure-responsive switch which can establish or interrupt the motor driving circuit in response to the pressure difference across the compressor so that the switch is turned off after the motor is once started, have never been used in the control systems of the compressors.

SUMMARY OF THE INVENTION

One of the objects of the present invention is therefore to provide a control system for a pole-changing-motor-driven compressor which stops the motor in case of the pole changing thereof and starts it only after the operating conditions of the compressor change to permit the re-starting of the motor, whereby the reliable and dependable pole changing operation can be ensured and the motor may be prevented from being damaged.

Another object of the present invention is to provide a control system for changing the poles of a pole-changing motor which is very simple in construction and inexpensive to manufacture.

A further object of the present invention is to provide a control system for changing the poles of a pole-changing motor which stops the motor in case of the pole changing thereof and starts it as soon as the conditions permit.

A further object of the present invention is to provide a control system for a pole-changing-motor-driven compressor which stops the compressor in case of the pole changing of the motor and then starts it again in a very stable, reliable and dependable manner.

A further object of the present invention is to provide a control circuit for a pole-changing-motor-driven compressor whose erratic operation in case of the pole changing of the motor can be completely eliminated.

A further object of the present invention is to provide a control system for a pole-changing-motor-driven compressor which re-starts the motor in response to the pressure difference across the compressor.

A further object of the present invention is to provide a control system for a pole-changing-motor-driven compressor which can detect the malfunction or breakdown of a switch which is actuable in response to the variation in pressure difference across the compressor.

A further object of the present invention is to provide the control system for protecting the compressor motor by the actuation of the pressure responsive switch in case of the breakdown of the compressor.

The above and other objects of the present invention is attained by a control system for a pole-changing-motor-driven compressor, comprising a control circuit including means for stopping the compressor in case of the pole changing of a pole-changing motor, and contactor whose self-holding or self-latching circuit is established in cooperation with a switch which is actuated only after the compressor has been completely stopped and which contactor is so arranged as to start the compressor again.

BRIEF DESCRIPTION OF THE DRAWING

Same reference numerals are used to designate similar parts throughout the figures.

DESCRIPTION OF THE PREFERRED EMBODIMENTS

Figure 1:
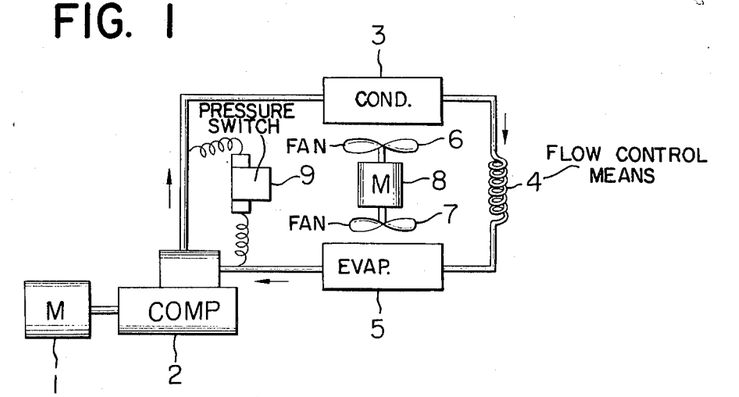
FIG. 1 is a schematic diagram of a compression type refrigeration cycle of an air conditioner incorporating a control system in accordance with the present invention.

Refrigeration Cycle, FIG. 1

A refrigeration cycle shown in FIG. 1 consists of a compressor 2 driven by a pole-changing motor 1, a condenser 3, means 4 for controlling the flow of refrigerant, an evaporator 5, a fan motor 8 with fans 6 and 7 for blowing the air through the condenser 3 and the evaporator 5, and a pressure-operated switch 9 actuable in response to the difference in pressure between the suction and discharge sides of the compressor 2. This refrigeration cycle may be of course converted into a heat pump cycle.

Figure 2:
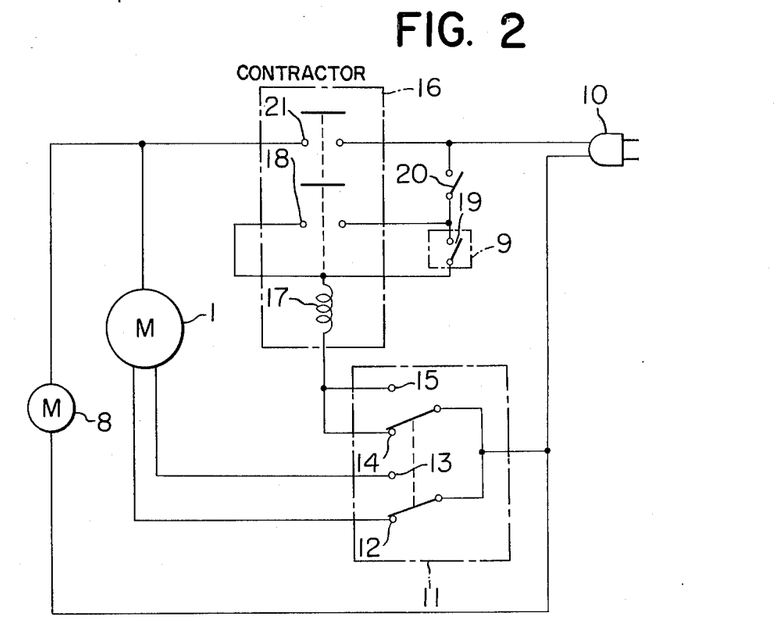
FIGS. 2 and 3 are diagrams of first and second embodiments, respectively, of a control system in accordance with the present invention for a pole-changing-motor-driven compressor.

First Embodiment, FIG. 2

Referring to FIG. 2, one of the terminals of a plug connector 10 is connected to a pole changer 11 with its low speed and high speed contacts 12 and 13 connected to the corresponding terminals of the pole-changing motor 1. A first contact 14 and a second contact 15 of the pole changer 11 is connected to one end of a coil 17 of an electromagnetic contactor 16 having its the other end connected to a first normally-open contact 18 of the electromagnetic contactor 16 and to a movable contact of the pressure-operated switch 9. A parallel circuit consisting of the first normally-open contact 18 and a stationary contact 19 of the pressure-operated switch 9 is connected in series with the movable contact of a contactor 20 having its stationary contact connection to the other terminal of the plug connector 10. The first normally-open contact 18 is a self-holding or self-latching contact of a self-holding or self-latching circuit which keeps the energization of the coil 17 of the electromagnetic contactor 16 even when the pressure-operated switch 9 is opened. A second normally-opened contact 21 is connected to the compressor motor 1 and the fan motor 8, and establishes or interrupts an electrical circuit which is independent of a circuit including the first normally-open contact 18.

Next the mode of operation of the first embodiment with the above construction will be described hereinafter. When the compressor motor 1 is to be started, the pole changer 11 closes the low-speed contact 12 and the first stationary contact 14 while the pressure-operated switch 9 closes the contact 19 because the difference in pressure between the suction and discharge sides of the compressor 2 is less than a predetermined level (A kg/cm$^2$). Therefore when the contactor or switch 20 is closed, the circuit interconnecting in series, in the order to be named, the pole changer 11, the coil 17, the pressure-operated switch 9, the contactor or switch 20 and the plug connector 10 is established so that the coil 17 is energized. As a result, both the first and second normally-open contacts 18 and 21 of the electromagnetic contactor 16 are closed so that the electric circuit for energizing the compressor motor 1 and the fan motor 8 is established and consequently the compressor motor 1 is started at a low speed while the fan motor rotates at a predetermined speed.

When the difference in refrigerant pressure between the suction and discharge sides of the compressor 2 increases in excess of B kg/cm$^2$ higher than A kg/cm$^2$, the pressure-operated switch 9 opens its contact 19, but since the first normally-open contact 18 is not opened, the coil 17 is kept energized. The second normally-open contact 21 is not opened so that both the compressor motor 1 and the fan motor 8 keep rotating.

When the pole changer 11 is so operated as to open the low-speed contact 12 and the first stationary contact 14 while closing the high-speed contact 13 and the second stationary contact 15, the coil 17 is de-energized for a very short time interval so that both the first and second normally-open contacts 18 and 21 are opened. As a result the compressor motor 1 is completely stopped, and consequently the pressure difference across the compressor 2 decreases within a short time interval and drops to less than A kg/cm$^2$ so that the pressure-operated switch 9 closes its contact 19 and consequently the coil 17 is immediately energized again, closing the first and second normally-open contacts 18 and 21 again. As a result, the compressor motor 1 is connected to the high-speed connection interconnecting among the closed second contact 13 of the pole changer 11, the compressor motor 1, the closed second normally-open contact 21 of the electromagnetic contactor 16 and the plug connector 10, so that the compressor motor 1 is started at a high speed. Even when the pressure-operated switch 9 is opened, the compressor motor 1 keeps rotating in a manner substantially described above in connection with the low-speed operation of the motor 1.

When the contactor or switch 20 is opened when the compressor motor 1 is rotating at a low or high speed, the coil 17 is de-energized so that both the first and second contacts 18 and 21 of the contactor 16 are opened and consequently both the compressor motor 1 and the fan motor 8 are stopped.

Even when the contactor or switch 20 is closed immediately after it has been opened, the pressure-operated switch 9 will not close its contact 19 if the refrigerant pressure difference across the compressor 2 is higher than A kg/cm$^2$. Therefore the coil 17 is not energized and consequently the first and second normally-open contacts 18 and 21 are not closed. As a result, the compressor motor 1 is not energized.

When the refrigerant pressure difference across the compressor 2 decreases and drops below A kg/cm$^2$, the pressure-operated switch 9 is closed so that the coil 17 of the electromagnetic contactor 16 is energized and consequently both the first and second contacts 18 and 21 are closed. Therefore the compressor motor 1 is started again at a low or high speed; that is, the same speed with that of the compressor motor 1 when it was stopped.

The pressure A kg/cm$^2$ at which the pressure-operated switch 9 responds to close contact 19 may be suitably selected and may be of course 0 kg/cm$^2$ as far as the selected switch-actuating pressure will not adversely affect the starting of the compressor motor 1. Instead of the pressure-operated switch 9 of the type described, any suitable switches may be used which are capable of detecting and responding a physical change which occurs in the refrigeration cycle after the compressor 2 is stopped. For instance, it may be of a temperature-responsive type which responds to the difference in temperature of the refrigerant between the suction and discharge sides of the compressor 2. Alternatively it may be such that is is closed after the compressor 2 is stopped and is opened after the compressor is started.

Furthermore, instead of the starting-stopping contactor or switch 20, any other switches may be used. For instance, when a thermostat is used, the automatic ON-OFF operation of the compressor can be attained.

In summary, the first embodiment described above is characterized by the provision of (1) the self-holding or self-latching circuit which is established by the switch 5 which in turn is closed after the compressor motor is stopped and (2) the contactor or switch in the self-holding or self-latching circuit for controlling the ON-OFF operation of the compressor motor. Therefore when the number of poles of the pole-changing motor 1 is changed, the motor is always positively stopped for a short time interval, and thereafter it is re-energized after the conditions for permitting the easy starting of the motor are attained. As a result, the starting and pole-changing failures can be eliminated, and consequently any adverse effects on the service life of the compressor can be eliminated.

In order to ensure the above advantageous operations of the motor-compressor unit, it suffices only to incorporate into the self-holding or self-latching circuit a switch capable of responding to the physical change which occurs after the motor-compressor unit is stopped. When the pressure-operated switch capable of responding to the pressure difference between the suction and discharge sides of the compressor is used as described above, more reliable and dependable control can be attained. Furthermore, the use of the pressure-operated switch of the type described results in the minimum interruption time of the pole-changing motor in case of its pole changing so that the motor can be started immediately when it is required without any time lag. For instance when the control system in accordance with the present invention is incorporated in an air conditioning apparatus, the efficient operation of the latter can be ensured regardless of the change in loads so that the variation in desired temperature in a room or the like may be minimized.

Moreover, even in case of the power interruption, the control system can sustain its function so that the starting failure as well as the melting of the fuse in the power supply circuit may be prevented and that the longer service life of the compressor may be ensured.

Figure 3:
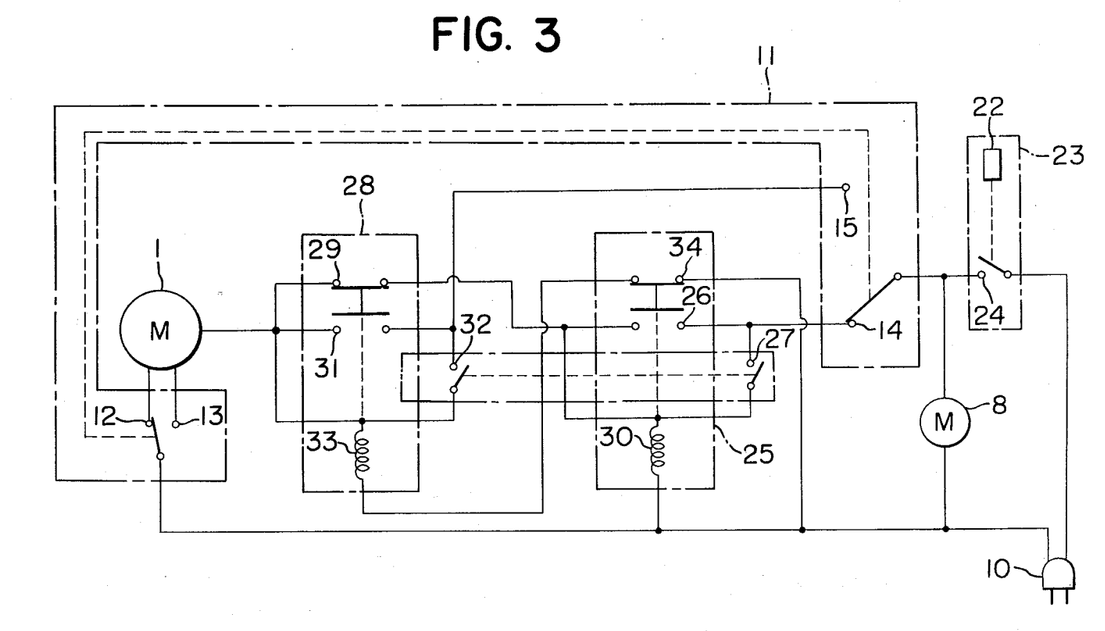

Second Embodiment, FIG. 3

Referring to FIG. 3 illustrating the second embodiment of the present invention, one terminal of the plug connector 10 is connected to the movable contact of the pole changer 11 with the low- and high-speed contacts 12 and 13, to one terminal of the fan motor 8, to a normally-closed contact 34 and one end of a coil 30 of a first double-make, double-break type electromagnetic contactor 25.

The other terminal of the plug connector 10 is connected through a thermostat 23 with a temperature sensor 22 and a stationary contact 24 to the movable contact of the pole changer 11 which closes either the first or second stationary contact 14 or 15 simultaneously when either the low- or high-speed contact 12 or 13 is closed in the manner described in connection with the first embodiment. The first stationary contact 14 is connected in series with a parallel circuit consisting of a normally-open contact 26 of the first electromagnetic contactor 25 and a stationary contact 27 of the pressure-operated switch 9. This parallel circuit in turn is connected through a normally-closed contact 29 of a second double-make, double-break type electromagnetic contactor 28 to the common terminal of the compressor motor 1. The other end of the coil 30 of the first contactor 25 is connected to both the movable contact of the pressure operated switch 9 and the normally-open contact 26. The normally-closed contact 34 of the first electromagnetic contactor 25 is connected to one end of a coil 33 of the second electromagnetic contactor 28. The other end of the coil 33 is connected to the movable contact of the pressure-operated switch 9 and to a normally-open contact 31. The second stationary contact 15 of the pole changer 11 is connected to a parallel circuit consisting of the normally-opened contact 31 of the second electromagnetic contactor 28 and a second stationary contacts 32 of the pressure-operated switch 9. This parallel circuit in turn is connected to the common terminal of the compressor motor 1.

Next the mode of operation of the second embodiment with the above construction will be described hereinafter. It is assumed that when the difference in refrigerant pressure on the suction and discharge sides of the compressor is less than A kg/cm$^2$, both the first and second contacts 27 and 32 of the pressure-operated switch 9 are closed. When the thermostat 23 is closed, the pressure-operated switch 9 is closed and the pole changer 11 closes the low-speed contact 12 and the first stationary contact 14, the compressor motor driving circuit is established which interconnects the plug connector 10, the thermostat 23 with its contact 24 closed, the closed first stationary contact 14 of the pole changer 11, the closed first contact 27 of the pressure-responsive switch 9, the normally-closed contact 29 of the second electromagnetic contactor 28, the compressor motor 1, the closed low-speed contact 12 and back to the plug connector 10. Therefore the compressor motor 1 is started at a low speed. The coil 30 of the first electromagnetic contactor 25 is also energized so that the normally-open contact 26 is closed while the normally-closed contact 34 is opened.

When the difference in pressure between the suction and discharge sides of the compressor 2 increases beyond A kg/cm$^2$ and in excess of B kg/cm$^2$, the pressure-operated switch 9 opens both the first and second contacts 27 and 32. However, the other (upper) end of the coil 30 is still connected to the first contact 14 through the closed normally-open contact 26, the coil 30 is kept energized so that the normally-open contact 26 is kept closed and consequently the circuit for driving the compressor motor 1 at a low speed is kept established. Therefore the compressor motor 1 keeps rotating at a low speed.

When the pole changer 11 is so actuated as to simultaneously open the low-speed contact 12 and the first stationary contact 14 while simultaneously closing the high-speed contact 13 and the second stationary contact 15, the coil 30 is de-energized so that the normally-open contact 26 is opened while the normally-closed contact 34 is closed. As a result, the compressor motor 1 is de-energized and stopped. When the pressure difference across the compressor 2 is still in excess of A kg/cm$^2$, the first and second contacts 27 and 32 thereof remain opened so that the circuit through the closed contact 15 for driving the compressor motor 1 at a high speed is kept interrupted.

When the pressure difference across the compressor drops below A kg/cm$^2$, the first and second contacts 27 and 32 of the pressure-operated switch 9 are simultaneously closed so that the closed second stationary contact 15 is connected through the closed second contact 32 of the switch 9 to both the common terminal of the compressor motor 1 and the other end of the coil 33 of the second contactor 28. Consequently the compressor motor 1 is started at a high speed, and the coil 33 is energized so that the normally-closed contact 29 is opened while the normally-open contact 31 is closed. As a result, the second stationary contact 15 is connected to the common terminal of the compressor motor 1 through both the closed second contact 32 of the pressure-responsive switch 9 and the closed normally-open contact 31 of the second electromagnetic contactor 28.

When the pressure difference across the compressor 2 exceeds B kg/cm$^2$, both the first and second contacts 27 and 32 of the switch 9 are opened, but, as described above, the closed second stationary contact 15 is connected through the closed normally-open contact 31 to the coil 33 so that the latter is kept energized and consequently the normally-open contact 31 is kept closed. As a result, the circuit for driving the compressor motor 1 at a high speed is kept established so that the motor 1 keeps rotating at a high speed even when the switch 9 is opened.

When the thermostat 23 is opened when the compressor motor 1 is rotating at a high or low speed, the motor driving circuit either through the first or second stationary contact 14 or 15 is interrupted so that the compressor motor 1 is immediately stopped.

Even when the thermostat 23 is closed immediately after it has been opened, the compressor motor driving circuit is not established unless the pressure difference across the compressor drops below A kg/cm$^2$ so that the pressure-operated switch 9 is closed again as in the case of the pole changing described above.

When the pressure difference across the compressor 2 drops below A kg/cm$^2$, the switch 9 is closed so that the compressor motor 1 is started again at the same speed with that of the motor 1 when it is stopped.

In the third embodiment, the coil 30 of the first electromagnetic contactor 25 and the coil 33 of the second electromagnetic contactor 28 are connected in parallel to the compressor motor 1 so that when the compressor motor 1 is driven, the simultaneous actuation and self-holding or self-latching of the first and second electromagnetic contactors 25 and 28 must be avoided. To this end, the first and second contactors 25 and 28 of the type described are selected and so interconnected that when the coil 30 of the first contactor 25 is energized, the coil 33 of the second contactor 28 is de-energized, and vice versa. Even when the continuity of one of the first and second contactors 25 and 28 is broken so that the normally-open contact is closed while the normally-closed contact is opened and the coil is consequently energized, the coil of the other contactor is de-energized. Therefore the continuous switching of the poles of the compressor motor 1 can be positively prevented. In other words, the second embodiment also functions as a motor protective device.

In summary, in the second embodiment described so far with reference to FIG. 3 either of the low- or high-speed compressor motor driving circuit is established through either of the two self-holding or self-latching circuits which are alternately established or interrupted by the actuation of the switch responsive to the pressure difference across the compressor. Therefore, when the number of poles of the pole-changing motor is changed in response to the change in loads on the compressor, one of the two self-holding or self-latching circuits causes the interruption of that of the other so that the motor is stopped for a short time. Therefore even when the compressor motor is energized so as to produce considerably greater torque for restarting the compressor because the difference in pressure between the suction and discharge sides thereof is greater, the starting and pole-changing failures will not occur and consequently will not cause the adverse effects on the service life of the compressor.

Figure 4:
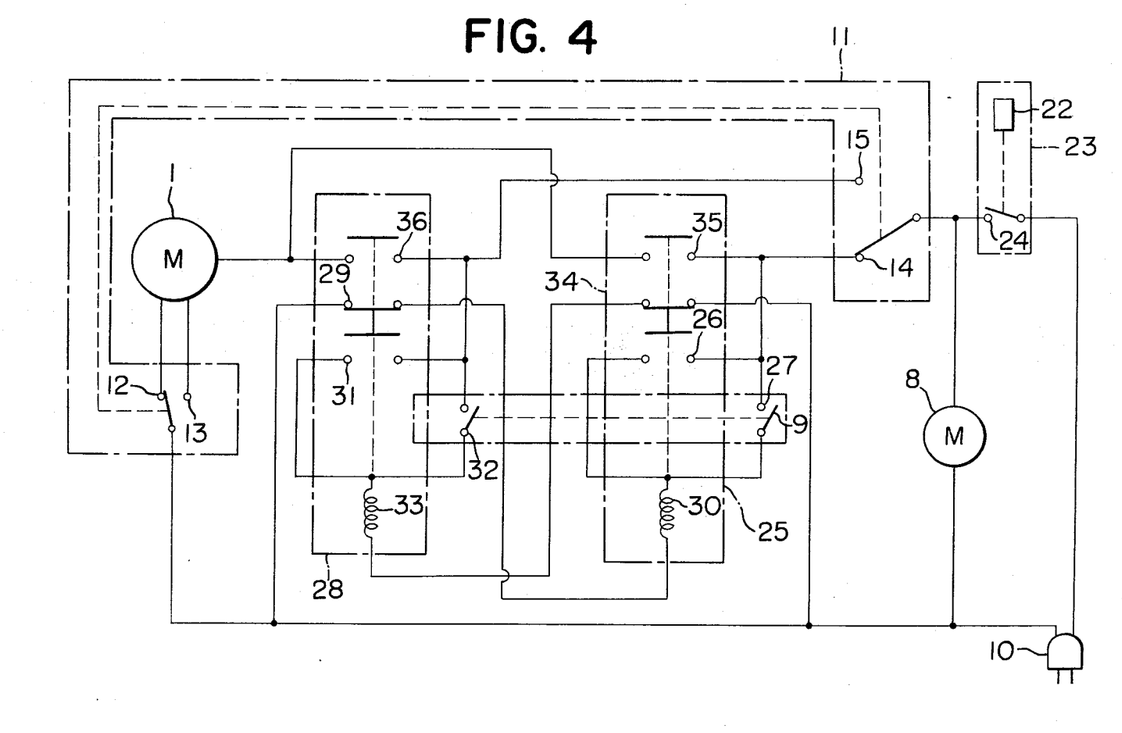
FIG. 4 is a circuit diagram of a third embodiment of the present invention which is an improvement over the second embodiment shown in FIG. 3.

Third Embodiment, FIG. 4

The third embodiment shown in FIG. 4 is an improvement over the second embodiment shown in FIG. 3. Whereas the normally-open contacts 26 and 31 of the first and second electromagnetic contactors 25 and 28 in the second embodiment have a double function of establishing not only the self-holding or self-latching circuit but also the compressor motor driving circuit, in the third embodiment the first and second electromagnetic contactors 25 and 28 further include normally-open contacts 35 and 36, respectively, which are connected to the first and second stationary contacts 14 and 15, respectively of the pole changer 11 for establishing the low- and high-speed motor driving circuits, respectively, independently of the self-holding or self-latching circuit. Therefore, the contacts 27 and 32 of the pressure-operated switch 9 have only the function of establishing or interrupting the circuits for energizing or de-energizing the coils 30 and 33 so that there is an advantage in that the pressure-operated switch with a low rated capacity may be used. In like manner, instead of connecting the thermostat in the motor driving circuit, a thermostat with a low rated capacity may be connected in the circuits for energizing or de-energizing the coils 30 and 33.

Figure 5:
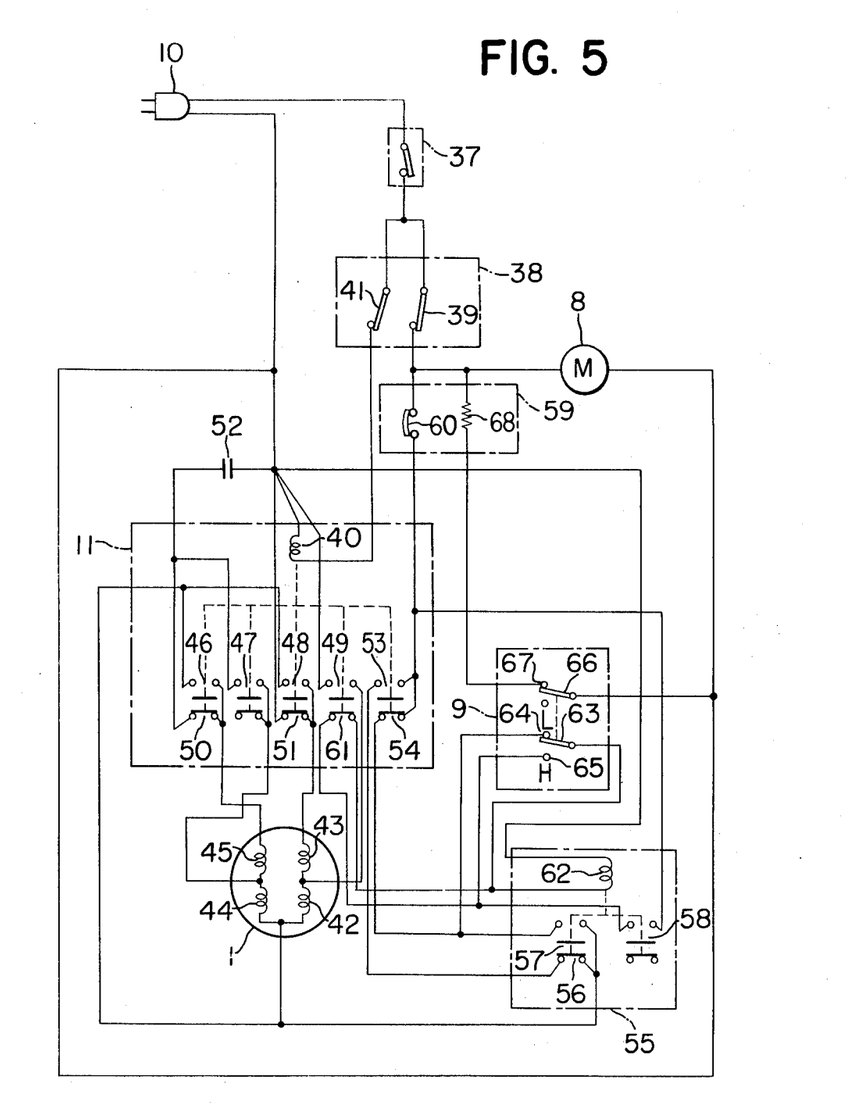
FIG. 5 is a diagram of a fourth embodiment of the present invention for a pole-changing, single-phase induction motor for driving a compressor.

Fourth Embodiment, FIG. 5

In the fourth embodiment shown in FIG. 5, a pole-changing single-phase induction motor is used as a compressor motor so that the automatic pole changing may be attained.

One terminal of the plug connector 10 is connected through an ON-OFF switch 37 to a thermostat 38 having a first contact 39 for establishing or interrupting the motor driving circuit and a second contact 41 for establishing or interrupting the circuit for energizing or de-energizing a coil 40 for actuating the pole changer 11 so as to automatically change the poles of the induction motor 1.

The induction motor 1 has a first main winding 42, a second main winding 43, a first auxiliary winding 44 and a second auxiliary winding 45. The high-speed connection or circuit for driving the motor 1 as a bipolar motor is established when the first and second main windings 42 and 43 are connected in parallel and the first and second auxiliary windings 44 and 45 are also connected in parallel. The low-speed connection or circuit for driving the induction motor 1 as a four pole motor is established when the first main winding 42 and the second main winding 43 are connected in series and the first and second auxiliary windings 44, 45 are connected also in series.

The switching from the bipolar motor to the four pole motor or vice versa is accomplished by the actuation of the pole changer 11. When the coil 40 is energized, four normally-open contacts 46, 47, 48 and 49 are closed so that the high-speed or bipolar motor connection is established, but when the coil 40 is de-energized normally-closed contacts 50 and 51 are closed again so that the low-speed or four-pole motor connection can be established. Both the low- and high-speed connection include a phase advancing capacitor 52.

The first contact 39 of the thermostat 38 is connected in series to a contact 60 of a time-delay timer or relay 59 which in turn is connected normally-open and -closed contacts 53 and 54 of the pole changer 11 which in turn are connected to normally-closed and -open contacts 56 and 57, respectively, of an electromagnetic contactor 55. Both the normally-closed and -open contacts 56 and 57 are connected to the junction between the first main and auxiliary windings 42 and 44 of the induction motor 1 and to the normally-open contacts 46 and 48 of the pole changer 11. The electromagnetic contactor 55 further includes a normally-open contact 58 connected to the normally-open and -closed contacts 53 and 54 of the pole changer 11 and to a normally-closed contact 61 of the pole changer 11.

The pressure-operated or pressure-responsive switch 9 of the fourth embodiment is so arranged that its first movable contact 63 closes a first stationary contact 64 when the pressure difference across the compressor 2 (See FIG. 1) is almost zero, but it closes a second stationary contact 65 when the pressure difference increases in excess of a predetermined level, for instance 2 kg/cm². The first and second stationary contacts 64 and 65 are connected to the normally-open contacts 57 and 58, respectively, of the electro-magnetic contactor 55, while the movable contact 63 is connected to one (lower) end of a coil 62 of the contactor 55. When this coil 62 is energized normally-closed contact 56 is opened while the normally-open contacts 57 and 58 are closed.

The switch 9 further includes a second movable contact 66 interlocked with the first movable contact 63. When the pressure difference across the compressor 2 reaches almost zero, the second movable contact 66 is displaced in unison with the first movable contact 63 to close a stationary contact 67.

A heater 68 which is in parallel with the contact 60 of the time-delay timer 59 is connected through the stationary contact 67 and the second movable contact 66 of the pressure-responsive switch 9 to the other terminal of the plug connector 10.

Next the mode of operation of the fourth embodiment applied to the air conditioning or cooling system will be described hereinafter. The plug connector 10 is connected to a power source, and the ON-OFF switch 37 is closed. Since the temperature in a room is still high, the first and second contacts 39 and 41 of the thermostat 38 are closed so that the coil 40 of the pole changer 11 is energized, and consequently the normally-open contacts 46 through 49 and 53 are closed. As a result, the first and second main windings 42 and 43 are connected in parallel while the first and second auxiliary windings 44 and 45 are also connected in parallel so that the high-speed connection or bipolar motor connection is established. The current flows from the plug connector through the ON-OFF switch 37, the closed contact 39 of the thermostat 38, the closed contact 60 of the time-delay timer 59, the closed normally-open contact 53 of the pole changer 11, and the normally-closed contact 56 of the electromagnetic contactor 55 into the junction between the first main and auxiliary windings 42 and 44 and through the closed normally-open contacts 48 and 46 of the pole changer 11 into the second main and auxiliary windings 43 and 45 of the induction motor 1. Thereafter the current flows out of the junctions between the first and second main windings 42 and 43 and between the first and second auxiliary windings 44 and 45 through the closed normally-closed contacts 49 and 47 back to the plug connector 10. Thus the induction motor 1 is driven as a bipolar motor at a high speed. Therefore the compressor 2 is driven at a high speed so that the air conditioning or cooling apparatus operates at the full capacity to cool the room.

In the initial state immediately after the start of the compressor 2, the pressure difference thereacross is very little so that the first and second movable contacts 63 and 66 of the pressure-operated switch 9 keep closing the stationary contacts 64 and 67, respectively, as shown in FIG. 5, but after the compressor 2 is stared, the pressure difference increases. When the pressure difference exceeds 2 kg/cm², the first movable contact 63 opens the stationary contact 64 and closes the stationary contact 65 while the second movable contact 66 opens the stationary contact 67.

As the compressor 2 rotates at a high speed, the air conditioner operates at its full capacity to cool the room. When the temperature in the room drops below a predetermined level, the second contact 41 of the thermostat 38 is opened so that the coil 40 in the pole changer 11 is deenergized and consequently the normally-open contacts 46 through 49 and 53 are opened while the normally-closed contacts 50, 51, 54 and 61 are closed again. As a result, the low-speed or four-pole motor connection is established, but the induction motor 1 is stopped because the supply of current thereto is interrupted.

After the compressor 2 is stopped, the pressure difference thereacross gradually decreases, and when it exceeds a predetermined level at which the starting of the induction motor 1 is permitted, the pressure-operated switch 9 is actuated so that the first movable contact 63 opens the stationary contact 65 and closes the contact 64 while the second movable contact 66 closes the contact 67. Therefore the coil 62 of the electromagnetic contactor 55 is energized and consequently the normally-opened contacts 57 and 58 are closed while the normally-closed contact 56 is opened. As a result, the motor driving circuit is established so that the induction motor 1 is started again at a low speed. The compressor 2 is rotated at a low speed or at a low capacity so that the flow rate of the refrigerant discharged therefrom decreases with the resultant drop in heat-removal capacity of the air conditioner.

When the pressure difference across the compressor 2 increases again in excess of 2 kg/cm², the first movable contact of the pressure-responsive switch 9 opens the contact 64 and closes the contact 65 while the second movable contact 66 opens the contact 67. However, the coil 62 of the contactor 55 is kept energized because the current flows from the plug connector 10 through the ON-OFF switch 37, the closed contact 39 of the thermostat 38, the closed normally-opened contact 58 of the contactor 55 and the normally-closed contact 61 of the pole changer 11 to the coil 62. That is, the self-holding or self-latching circuit for the coil 62 is established. The circuit established by the closing of the contact 65 by the first movable contact 63 of the switch 9 is connected in parallel to the normally-closed contact 61 of the pole changer 11.

When the cooling load is lower than the low heat-removal capacity of the compressor 2 driven by the four-pole motor 1, the temperature within the room further drops. When the temperature drops below a predetermined level, the thermostat 39 is opened so that the coil 62 of the electromagnetic contactor 55 is de-energized so that the normally-open contacts 57 and 58 are opened while the normally-closed contact 56 is closed again. As a result, the induction motor 1 and hence the compressor 2 are stopped.

Under these conditions even when the temperature rapidly rises so that the thermostat 38 is closed, the pressure-operated switch 9 remains opened as long as the pressure difference across the compressor 2 remains above a predetermined level. Therefore the first movable contact 63 will not close the contact 64 so that the coil 62 of the electro-magnetic contactor 55 remains de-energized. As a result, the induction motor 1 remains de-energized, and the starting failure of the compressor 2 may be prevented.

When the pressure difference across the compressor 2 reaches to nearly zero, the movable contact 63 of the switch 9 opens the contact 65 and closes the contact 64 so that the coil 62 of the contactor 55 is energized again and consequently the normally-open contacts 57 and 58 are closed while the normally-closed contact 56 is opened. The motor driving circuit is established again so that the induction motor 1 is started as a four-pole motor at a low speed. Therefore the compressor 2 is also driven at a low speed so that the air conditioner operates at a low heat-removal capacity.

When the compressor 2 is driven again, the pressure difference thereacross increases gradually. When the pressure difference exceeds a predetermined level, the pressure-operated switch 9 is actuated so that the first movable contact 63 opens the contact 64 and closes the contact 65, and consequently the self-holding or self-latching for the coil 62 is established again.

Since the restarted air conditioner operates at a low capacity to cool the room, the temperature in the room gradually increases when the cooling load is greater than this low cooling capacity. When the temperature rises about a predetermined level, the thermostat 38 is actuated so that its second contact 41 is closed to energize the coil 40 of the pole changer 11. The normally-open contacts 46, 47, 48, 49 and 53 are closed while the normally-closed contacts 50, 51, 54 and 61 are opened again so that the motor driving circuit is interrupted while the induction motor 1 is switched to the two-pole motor connection in the manner described hereinbefore.

When the pressure difference across the compressor 2 approaches nearly zero, the first movable contact 63 of the pressure-operated switch 9 opens the contact 65 and closes the contact 64 so that the coil 62 of the electromagnetic contactor 55 is de-energized again and consequently the normally-open contacts 57 and 58 are opened while the normally-closed contact 56 is closed again. As a result the motor driving circuit is established again so that the induction motor 1 is started as a bipolar motor at a high speed. Therefore the compressor 2 is driven at a high speed so that the air conditioner operates at the full capacity to cool the room.

In the fourth embodiment the normally-open and -closed contacts 53 and 54 are closed and opened by the energization and de-energization of the coil 40 of the pole changer 11, but they may be contacts of a relay or the like which is controlled by the pole changer 11 or which controls the energization and de-energization of the coil of the pole changer 11.

The fourth embodiment has been so far described in conjunction with the single-phase induction motor 1, but it is to be understood that the present invention is not limited thereto and that a three-phase motor may be also used. Furthermore when the first movable contact 63 of the pressure-operated switch 9 can instantaneously switch between the stationary contacts 64 and 65 so that the self-holding or self-latching circuit for the coil 62 of the electromagnetic contactor 55 can be continuously held without any interruption, the normally-closed contact 61 of the pole changer 11 may be eliminated. Furthermore, it is apparent that instead of the pole changer 11 having a plurality of normally-open and -closed contacts, a plurality of single-pole, single throw, normally-open relays may be used.

The time-delay timer 59 which is connected in series to the pressure-operated switch 9 functions in case of the failure of the latter. That is, when the switch 9 fails to respond to the variation in pressure difference across the compressor 2 so that the first movable contact 63 keeps closing the stationary contact 64, the induction motor 1 will not stop in case of the switching to the low-speed connection from the high-speed connection or vice versa. In other words, the induction motor 1 keeps rotating even when the low-speed connection is switched to the high-speed connection or vice versa. However the switch 9 includes the second movable contact 66 which closes the stationary contact 67 when the pressure difference across the compressor 2 approaches zero so that the heater 68 in the time-delay timer 59 is energized. As a result, the contact 60 of the time-delay timer 59 is opened a predetermined time after the heater 68 is energized so that the motor driving circuit is interrupted and consequently the induction motor 1 and the compressor 2 are stopped. Therefore, the continuous pole changing of the induction motor 1 and hence the starting failure thereof may be prevented so that the burning of the windings thereof may be avoided.

In case of the leakage of the refrigerant out of the refrigeration cycle or breakdown of packings interposed between the suction and discharge sides of the compressor 2, the pressure difference across the compressor increases at a very slow rate after the compressor is started so that the pressure-operated switch 9 is not actuated a predetermined time after the compressor 2 is started. In this case, the time-delay timer 59 also functions to open the contact 60 so that the motor driving circuit is also interrupted and the failure of the motor 1 or compressor 2 can be detected.

As described above, the fourth embodiment comprises the pole changer for selecting the low-speed or four-pole motor driving connection or high-speed or two-pole motor driving connection for the induction motor for driving the compressor, the pressure-operated or pressure-responsive switch of single-pole, double-throw type responsive to the difference in pressure between the suction and discharge sides of the compressor, and the electromagnetic contactor adapted to establish the self-holding or self-latching circuit through the contact of the switch which is closed when the pressure difference across the compressor increases in excess of a predetermined level. The power is supplied to the induction motor through the series circuit consisting of one of the contacts of the pole changer and the contactor, and the contactor is controlled by the pressure-operated switch and the pole changer. Therefore in case of the pole changing of the motor in order to change the speed of the compressor in response to the variation in loads, the motor is always stopped and is kept de-energized until the pressure difference across the compressor reaches a level at which the positive re-starting of the motor 1 ensured.

In the second, third and fourth embodiments described above with reference to FIGS. 3, 4 and 5, the pressure-operated or pressure-responsive switch is used to establish the self-holding or self-latching circuit, but it is to be understood that, as described above in connection with the first embodiment shown in FIG. 2, instead of the pressure-operated or pressure-responsive switch any suitable switches or the like responsive to the variation in physical quantity which occurs after the compressor is stopped may be used, and a time-delay timer or relay whose function is substantially similar to the pressure-operated or pressure-responsive switch may be of course used.

What is claimed is:

1. A control system for a motor-driven compressor, comprising:
   a. a two-speed motor capable of driving said compressor, at a high speed and at a low speed,
   b. first control means for changing the speed of said motor and for temporarily interrupting the power supply to said motor during said speed changing, thereby stopping said compressor,
   c. electrical switching means coupled to said compressor, said switching means having a first position for a predetermined time interval after said compressor has stopped, and a second position after said predetermined time interval has expired,
   d. second control means including a self-latching circuit actuable in response to an electrical signal from said switching means to couple said power supply to said motor,
   said motor remaining stopped during said speed changing, being enabled to start again after said predetermined time interval of said switching means, and being supplied with power regardless of the position of said switching means once said motor is started again.

2. A control system as set forth in claim 1, wherein said first control means comprises
   a. first switching means for causing said speed changing of said motor, and
   b. second switching means for interrupting the power supply to said motor during said speed changing for a predetermined time interval.

3. A control system as set forth in claim 1 wherein said switching means comprises a switch actuable in response to variation in a physical parameter as a result of the stoppage of said compressor.

4. A control system as set forth in claim 3 wherein said switch comprises a pressure-responsive switch actuable in response to the pressure difference of the refrigerant between an inlet port and a discharge port of said compressor.

5. A control system as set forth in claim 3 wherein said switch comprises a temperature-responsive switch actuable in response to the temperature difference of the refrigerant between an inlet port and a discharge port of said compressor.

6. A control system as set forth in claim 3 wherein said switch is of the type which is closed after said compressor is stopped and is opened after said compressor has been re-started.

7. A control system as set forth in claim 1 further comprising third switching means controlled by said self-latching circuit for resuming the operation of said motor.

8. A control system as set forth in claim 1 wherein said second control means comprises a solenoid operated switch which is caused to open in response to the actuation of second switching means for interrupting the power supply to said motor for a predetermined time during said speed changing.

9. A control system as set forth in claim 8 wherein said solenoid operated switch is closed by said switching means which has been actuated after the stoppage of said compressor, thereby resuming the operation of said motor.

10. A control system as set forth in claim 8 wherein said solenoid operated switch has a first normally open contact and a second normally open contact, power being supplied to said motor through said first normally open contact, said second normally open contact being connected in parallel with said switching means to establish said self-latching circuit.

11. A control system as set forth in claim 1 wherein said second control means comprises a first solenoid operated switch and a second solenoid operated switch both of which are actuable in response to the operation of said first control means.

12. A control system as set forth in claim 11 wherein each of said first and second solenoid operated switches includes
    coil means,
    a normally closed contact, and
    a normally open contact connected through said switching means to said coil means and operatively interlocked with said normally open contact,
    said normally closed contact and said second normally opened contact of one of said first and second solenoid operated switches being so interconnected to the normally open and normally closed contacts of the other solenoid operated switch that when the normally open and normally closed contacts of one solenoid operated switch are closed and opened, respectively, a self-latching circuit is established for keeping said coil means in said one solenoid operated switch energized while the self-latching circuit for said coil means in the other solenoid operated switch is open.

13. A control system as set forth in claim 12 wherein each of said first and second solenoid operated switches further includes an additional normally open contact through which power is supplied to said motor.

14. A control system as set forth in claim 1 wherein said second control means comprises a solenoid operated switch controlled by a thermostat responsive to ambient temperatures.

15. A control system as set forth in claim 1 wherein said switching means has a first contact and a second contact both of which are caused to close when the pressure difference between a suction port and a discharge port of said compressor drops below a predetermined pressure, and
    delay means is connected to said second contact to interrupt the power supply to said motor when said second contact has been kept closed longer than a predetermined time interval.

16. A control system for a two-speed motor-driven compressor, comprising:
    a. first solenoid operated relay means for causing speed changing of a two-speed motor for driving said compressor, b. first switching means for stopping said motor for a predetermined time interval during said speed changing,
c. second switching means actuable in response to the variation in a physical parameter caused by the stoppage of said compressor, and
d. second solenoid operated relay means actuable in response to the actuation of said second switching means for establishing a self-latching circuit, said first solenoid operated relay means interrupting the power supply to said motor for said predetermined time interval during said speed changing and thereafter causing said motor to be driven again in response to the actuation of said second switching means.

17. A control system as set forth in claim 16, wherein said first solenoid operated relay means comprises:
a. a plurality of contacts which are simultaneously caused to be opened or closed to cause said speed changing of said motor, and
b. a pair of normally open and normally closed contacts which are caused to be closed and opened, respectively, when said plurality of contacts are caused to be opened or closed; and
said second solenoid operated relay means comprises a. a normally closed contact connected in series with said normally open contact of said first solenoid operated relay means, and
b. a normally open contact connected in series with said normally closed contact of said first solenoid operated relay means,
whereby the power supply to said motor is controlled through said normally open or normally closed contact of said second solenoid operated relay means.

18. A control system as set forth in claim 16, further comprising:
a. a first contact set which is caused to be closed when the pressure difference between a suction port and a discharge port of said compressor drops below a first predetermined pressure level, and
b. a second contact set which is caused to be closed when the pressure difference between said intake port and said discharge port of said compressor rises above a second predetermined pressure level higher than said first predetermined pressure level, so that when said second solenoid operated relay means is connected to said first contact set, said motor is caused to start, whereas when said second solenoid operated relay means is connected to said second contact set, a self-latching circuit of said second solenoid operated relay means is established.

* * * * *

UNITED STATES PATENT OFFICE
CERTIFICATE OF CORRECTION

Patent No. 4,064,420                    Dated December 20, 1977

Inventor(s)   Jiro Yuda, et al

It is certified that error appears in the above-identified patent and that said Letters Patent are hereby corrected as shown below:

Column 10, line 12:   "closing" should be --closed--.

line 14:   "stared" should be --started--.

Signed and Sealed this

Sixteenth Day of May 1978

[SEAL]

Attest:

RUTH C. MASON
Attesting Officer

LUTRELLE F. PARKER
Acting Commissioner of Patents and Trademarks